United States Patent
Bamber

(10) Patent No.: US 8,231,818 B2
(45) Date of Patent: Jul. 31, 2012

(54) PRESSURE CONTROL VALVE ASSEMBLY

(75) Inventor: Daniel Bamber, St. Clair Shores, MI (US)

(73) Assignee: Eaton Corporation, Cleveland, OH (US)

( * ) Notice: Subject to any disclaimer, the term of this patent is extended or adjusted under 35 U.S.C. 154(b) by 206 days.

(21) Appl. No.: 12/830,693

(22) Filed: Jul. 6, 2010

(65) Prior Publication Data

US 2010/0270703 A1 Oct. 28, 2010

Related U.S. Application Data

(62) Division of application No. 11/685,578, filed on Mar. 13, 2007, now Pat. No. 7,766,040.

(51) Int. Cl.
- B29C 45/14 (2006.01)
- B29B 13/00 (2006.01)
- B21D 51/16 (2006.01)
- F15B 13/04 (2006.01)
- F16K 11/20 (2006.01)
- A01G 25/16 (2006.01)

(52) U.S. Cl. ..... 264/273; 264/241; 264/259; 264/271.1; 264/274; 264/275; 264/278; 264/279; 264/299; 264/319; 264/328.1; 251/213; 251/356; 137/596; 137/597; 137/625; 137/625.2; 137/625.25; 137/625.26; 29/890.12; 29/890.127

(58) Field of Classification Search ............ 264/241, 264/259, 271.1, 273, 274, 275, 278, 279, 264/299, 319, 328.1; 251/213, 356; 29/890.12; 29/890.127; 137/596, 597, 625, 625.2, 625.25, 137/625.26

See application file for complete search history.

(56) References Cited

U.S. PATENT DOCUMENTS

| | | | | |
|---|---|---|---|---|
| 3,271,845 | A | * | 9/1966 | Breher .............. 29/890.127 |
| 3,580,286 | A | | 5/1971 | Bash |
| 3,698,687 | A | * | 10/1972 | Kitamura .............. 251/315.01 |
| 3,807,692 | A | * | 4/1974 | Usab et al. .............. 251/315.15 |
| 3,856,260 | A | | 12/1974 | Giordano |
| 3,894,712 | A | | 7/1975 | Millar et al. |
| 3,961,770 | A | * | 6/1976 | Wrasman .............. 251/315.05 |
| 4,151,861 | A | | 5/1979 | Bohrdt et al. |
| 4,172,583 | A | * | 10/1979 | Wrasman .............. 251/172 |
| 4,180,542 | A | * | 12/1979 | Wrasman .............. 264/242 |
| 4,430,285 | A | * | 2/1984 | Runyan et al. .............. 264/242 |
| 4,488,573 | A | * | 12/1984 | Runyan et al. .............. 137/375 |
| 4,516,594 | A | * | 5/1985 | Martin et al. .............. 137/15.18 |
| 5,894,860 | A | | 4/1999 | Baldauf et al. |
| 5,915,416 | A | | 6/1999 | Okazaki et al. |
| 6,260,820 | B1 | * | 7/2001 | Chowdhury .............. 251/287 |
| 6,810,909 | B2 | | 11/2004 | Herbert et al. |
| 6,901,942 | B2 | * | 6/2005 | Krimmer et al. .............. 137/15.25 |
| 7,107,678 | B2 | * | 9/2006 | Arai et al. .............. 29/888.4 |
| 7,744,061 | B2 | * | 6/2010 | Isogai et al. .............. 251/208 |
| 2003/0136449 | A1 | | 7/2003 | Boddy |
| 2007/0245561 | A1 | * | 10/2007 | Miyauchi et al. ........ 29/890.122 |

* cited by examiner

*Primary Examiner* — Christina Johnson
*Assistant Examiner* — Atul P Khare
(74) *Attorney, Agent, or Firm* — Dykema Gossett PLLC

(57) ABSTRACT

A pressure control valve assembly including a valve body with a valving cavity, a metal insert, a member and ball, a plastic internal ball guide, and a plug. The metal insert, which is received within the valving cavity, includes an exhaust port, a pressure control port, a supply port, and a plug-receiving end. The plastic internal ball guide is included within a portion of the metal insert. The member extends within a portion of the insert and is movable with respect to the exhaust port, the member moving a ball with respect to a supply port. In an embodiment, a plug is received within the plug-receiving end of the insert. A method for making a valve body for a valve assembly is also disclosed.

8 Claims, 6 Drawing Sheets

PRESSURE CONTROL VALVE ASSEMBLY

RELATED APPLICATIONS

This application is a divisional application and claims priority to U.S. patent application Ser. No. 11/685,578, filed Mar. 13, 2007, entitled PRESSURE CONTROL VALVE ASSEMBLY, now U.S. Pat. No. 7,766,040 and hereby incorporated by reference in its entirety.

TECHNICAL FIELD

The present invention relates to solenoid operated valves, including those of the type having a supply or inlet port, a pressure control outlet port, and an exhaust port through which fluid is discharged.

BACKGROUND

Solenoid valves have found widespread usage in controlling the flow of hydraulic fluid. Such valves may be employed to, among other things, provide control of a fluid pressure by controlling the fluid from an inlet port to a valving chamber communicating with a pressure control port and also controlling the amount of fluid bleed to the exhaust for maintaining a desired pressure at a pressure signal output port.

However, there is a desire for valve assemblies incorporating more cost-effective methods of manufacture and porting the pressures in the valve, including those in which a supply pressure is applied to the side of the valve and a control pressure communicates with an end of the valve.

SUMMARY

According to an aspect of the invention, a pressure control valve assembly may include a valve body with a valving cavity, a metal insert, a member and ball, a plastic internal ball guide, and a plug. The metal insert, which is received within the valving cavity, includes an exhaust port, a pressure control port, a supply port, and a plug-receiving end. The plastic internal ball guide is included within a portion of the metal insert. The member extends within a portion of the insert and is movable with respect to the exhaust port, the member moving a ball with respect to a supply port. In an embodiment, a plug may be received within the plug-receiving end of the insert. A method for making a valve body for a valve assembly is also disclosed.

BRIEF DESCRIPTION OF THE DRAWINGS

Embodiments of the invention will now be described, by way of example, with reference to the accompanying drawings, wherein.

DETAILED DESCRIPTION

Reference will now be made in detail to embodiments of the present invention, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
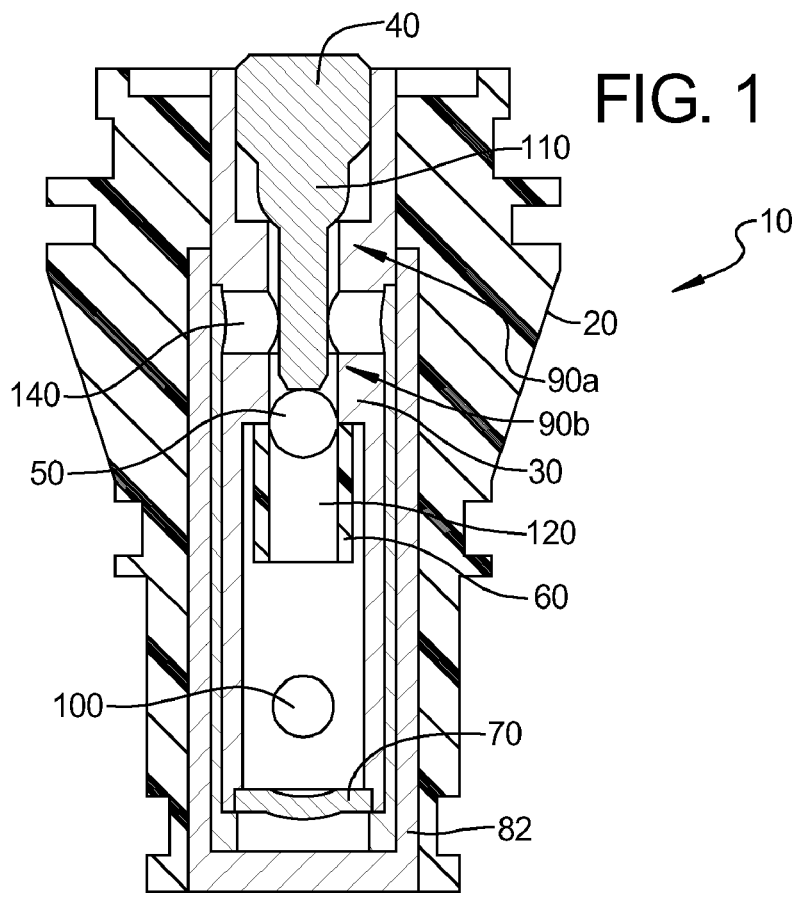
FIG. 1 is a cross-sectional view of a valve assembly according to an embodiment of the invention.

A cross-section of a pressure control valve assembly 10 according to an embodiment of the invention is illustrated in FIG. 1. The valve assembly 10 may, for instance, be employed in connection with a hydraulic solenoid.

The valve assembly 10 includes a valve body 20 that is configured to form an internal valving chamber (or cavity), an insert 30, a member 40, a ball 50, a plastic internal ball guide 60, and a plug 70. The valving chamber may be configured to retain and fully surround or encapsulate insert 30. Member 40, which may comprise a rod or poppet, may be configured to extend within a portion of insert 30 and may be movable with respect to an exhaust port. Further, member 40 may be configured to move a ball 50 with respect to a flow port. While not illustrated, in other embodiments, member 40 and ball 50 may be formed integrally as a unitary component. As used herein, in additional to traditional round or spherical components, the term "ball" is meant to also include components that may not necessarily be completely round, but rather may additionally include a component with a curved or spherical surface that is configured to communicate with a port in the assembly to restrict fluid flow. Embodiments of exhaust and flow ports are illustrated in connection with FIGS. 3 and 4 and are further discussed below. Further, if desired, several metering edges 90a, 90b, such as those identified in the embodiment illustrated in FIG. 1, may be included.

Figure 1A:
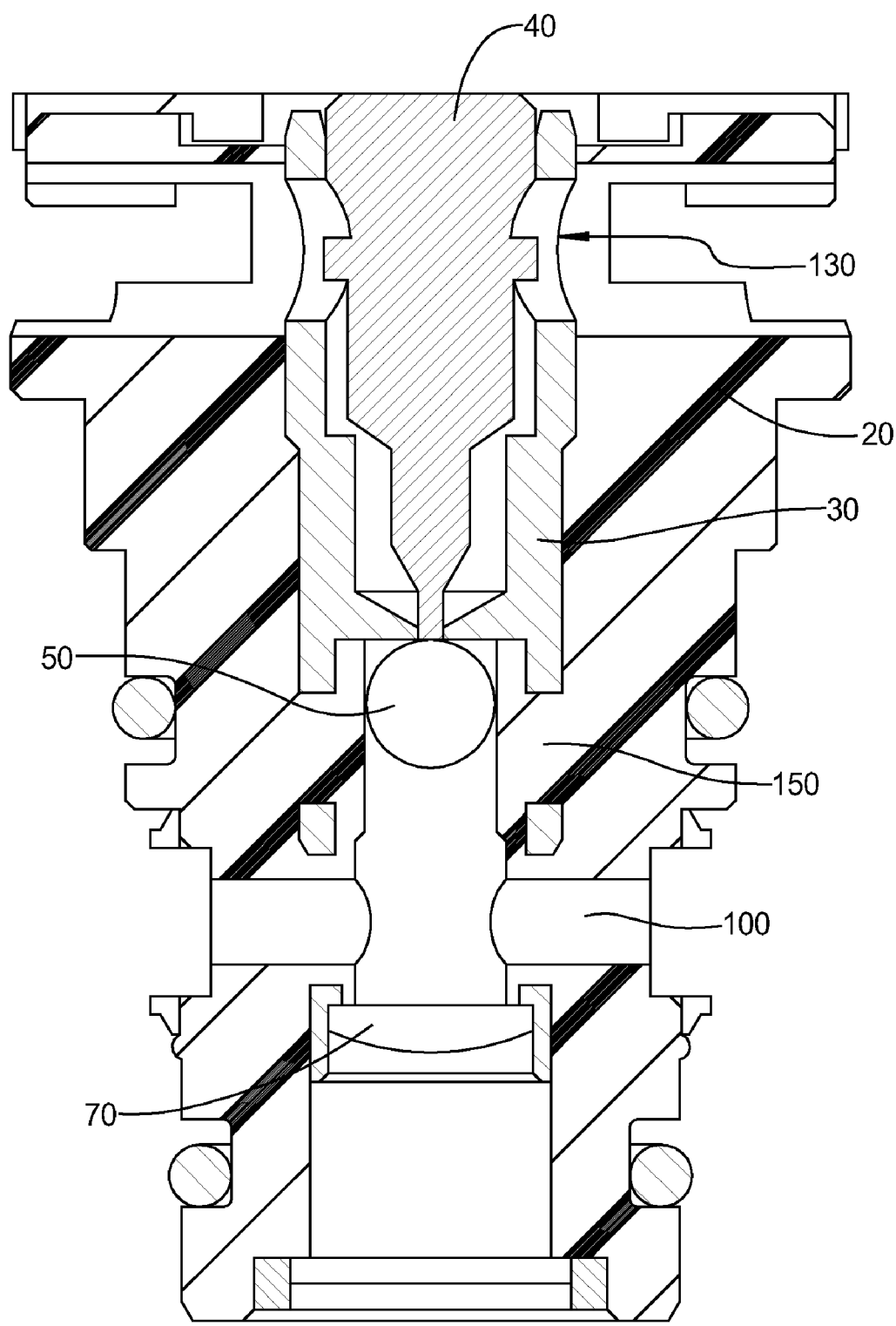
FIG. 1A is a cross-sectional view of a valve assembly according to another embodiment of the invention.

Another embodiment of a valve assembly is generally illustrated in FIG. 1A. With such an embodiment, plastic material may completely cover the internal wall of the supply port (as opposed to other embodiments which might include two small ball guides). During the formation of such a configuration, plastic may be allowed to flow from the outside of the insert to the inside of the insert around the perimeter of the supply port as well as through a plastic flow port (if a plastic flow port is provided).

Insert 30 may be comprised of one or more metals. In an embodiment, insert 30 may be comprised of brass. Also, at least a portion of the valve body 20 and plastic internal ball guide 60 may be comprised of plastic. In an embodiment, the plastic internal ball guide 60 and at least a portion of the valve body 20 that is proximate the ball guide 60 about a flow port may be formed in the same molding operation and may be comprised of the same plastic material. The plastic material may include, by way of example and without limitation, a nylon or glass-filled nylon. However, the invention is not limited to the specific metal and plastic materials disclosed above, and other metal and plastic materials that are suitable for the intended operational environment may instead be used.

Assembly 10 may further include one or more channel-forming members 80 positioned outside of insert 30 so as to permit fluid flow about insert 30. In the embodiment illustrated in FIG. 2, channel-forming members 80 are positioned about insert 30 and form two control pressure communication channels 82. The channel-forming members 80 may extend from a point about or below the lowermost portion of the insert 30 up to a point about or beyond an upper portion of control port 140. For instance, without limitation, as generally shown in connection with FIGS. 1 and 2, channel-forming members 82 are shown to extend from about a position below plug 70 to a position above control port 140. However, the invention is not limited to the illustrated configuration and may include less or more fingers 80 and/or communication channels 82, as may be necessary or desired for a given assembly or application. FIG. 2A generally illustrates another embodiment of bottom end of a portion of a valve assembly according to another embodiment of the invention.

Figure 2:
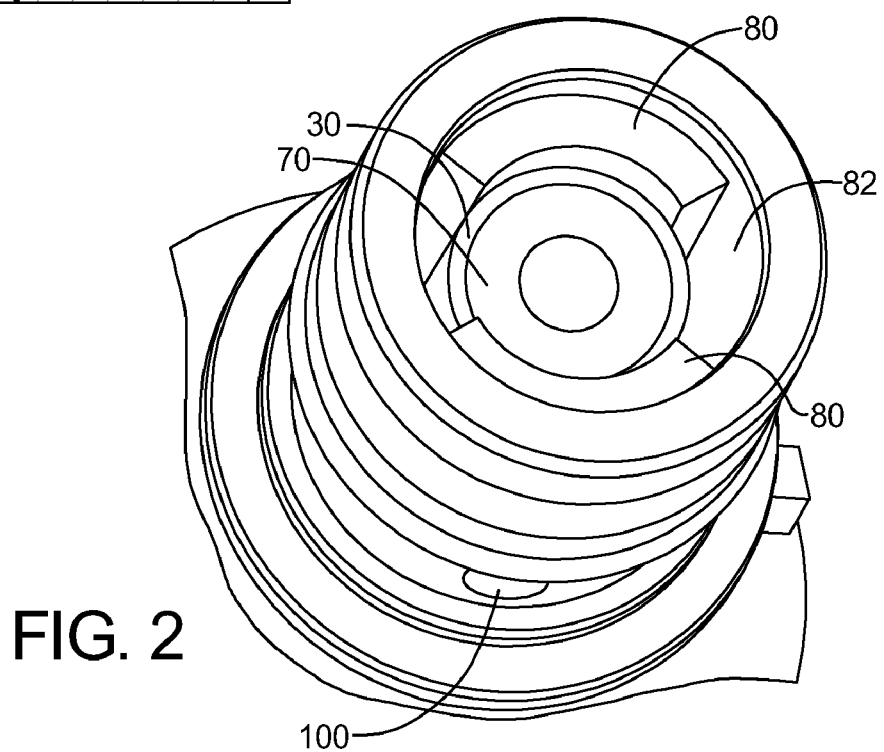
FIG. 2 is a bottom end perspective view of a portion of a valve assembly according to an embodiment of the invention.
Figure 2A:
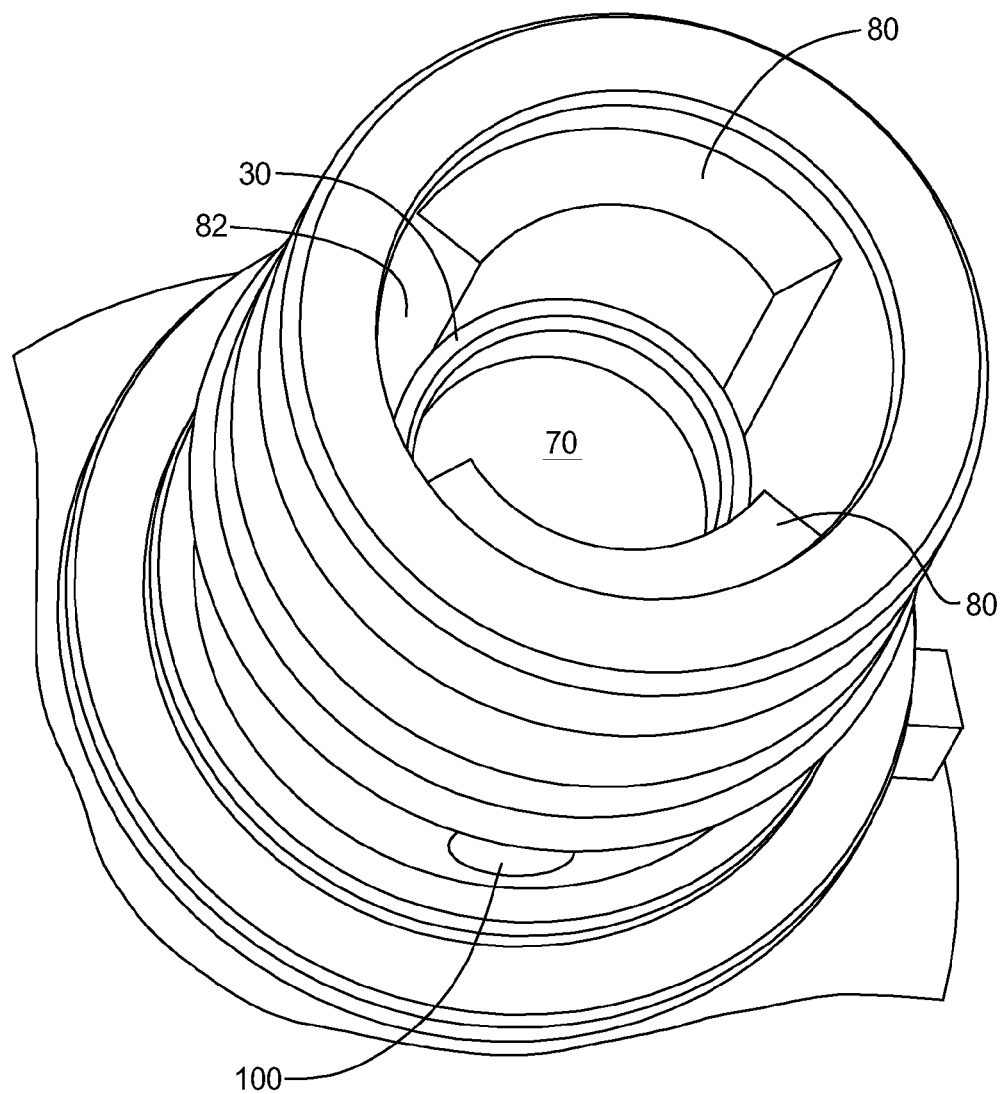
FIG. 2A is a bottom end perspective view of a portion of a valve assembly according to another embodiment of the invention.

As generally illustrated in FIGS. 1 and 2, insert 30 associated with assembly 10 includes a supply pressure port or supply port 100. The general locations identified by lead lines 110 and 120 indicate respective positions where an exhaust port and plastic flow port (both not shown in the instant view) may be positioned in an embodiment of the invention. However, the invention is neither limited to one having a separate plastic flow port, nor one having such ports in the locations as depicted. Moreover, even where a separate plastic flow port is provided, such ports may be provided in positions other than those designated by lines 110 and 120 provided that the intended functions are adequately served.

Figure 3:
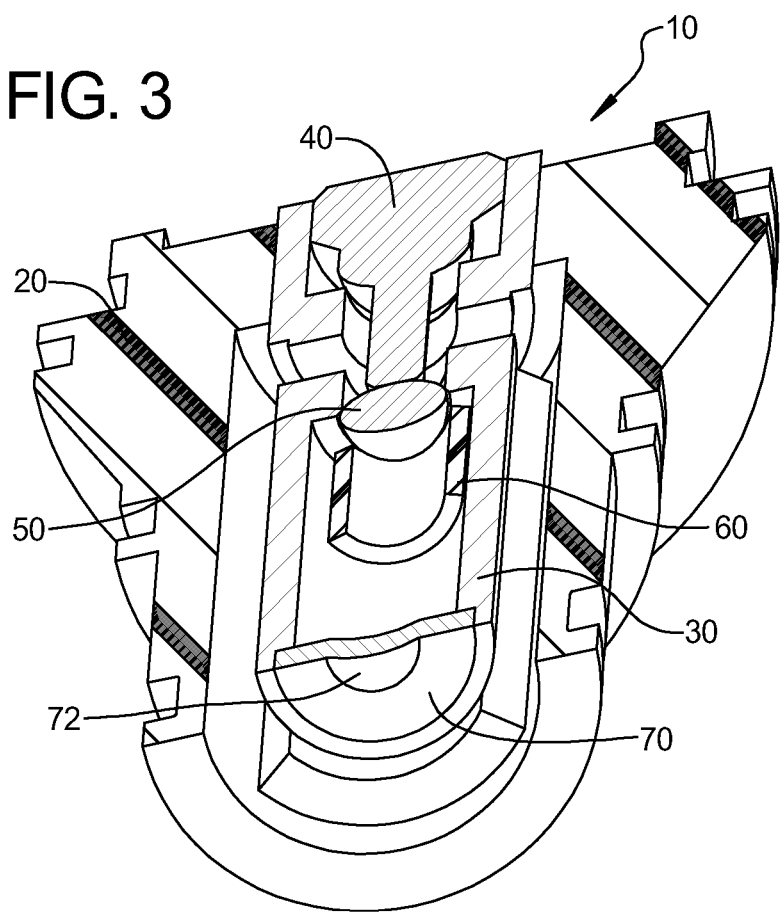
FIG. 3 is a cross-sectional perspective view of a portion of a valve assembly according to another embodiment of the invention.
Figure 3A:
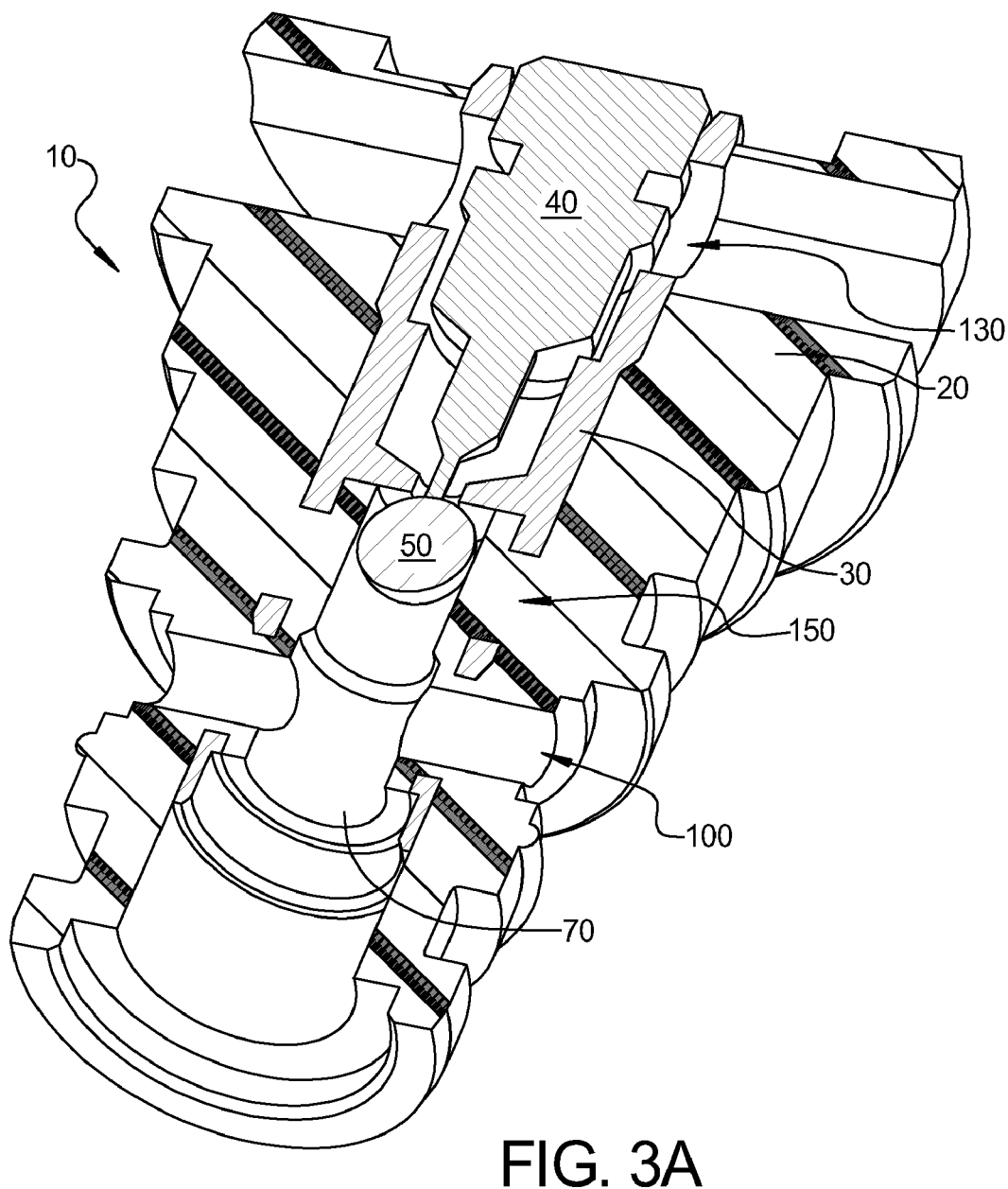
FIG. 3A is a cross-sectional perspective view of a portion of a valve assembly according to another embodiment of the invention.

FIG. 3 generally illustrates a cross-sectional perspective view of a portion of a valve assembly according to an embodiment of the invention. As generally illustrated, ball 50 may be configured for operational registry or communication with plastic internal ball guide 60. Further, a configuration of the assembly such as that disclosed can provide a centering feature for shut-off on a control end of . Further plug 70 may include a raised portion (generally identified as element 72) that extends further upwardly into a portion of insert 30. FIG. 3A generally illustrates another embodiment of the invention more of the type generally shown and described in connection with FIG. 1A.

Figure 4:
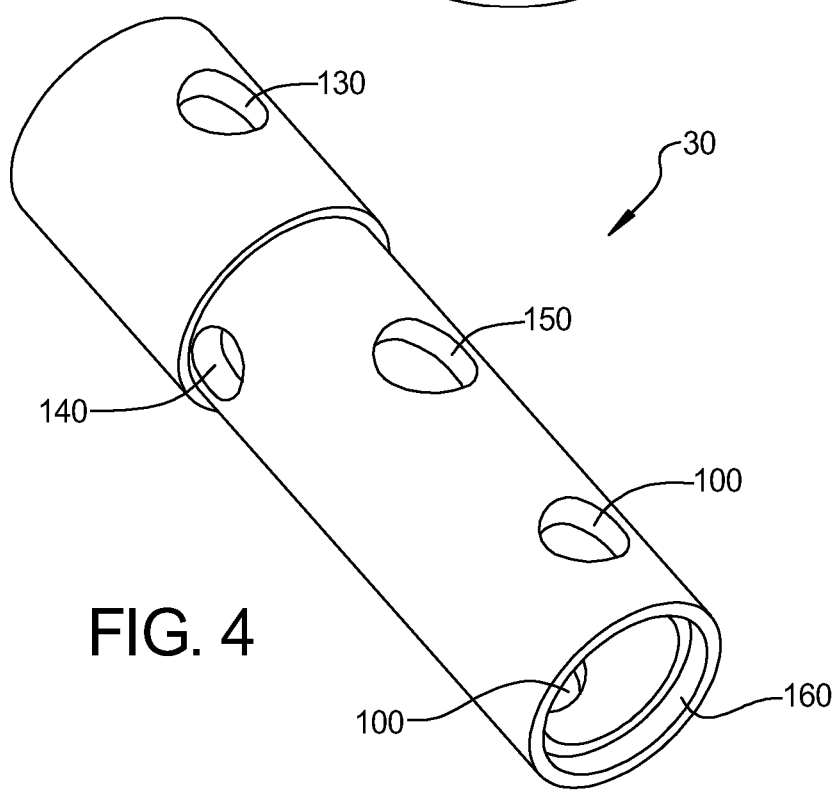
FIG. 4 is a side perspective view of an insert according to an embodiment of the invention.

An insert 30 according to an embodiment of the invention is generally illustrated in FIG. 4. Insert 30 may include an exhaust port 130, a control port 140, a plastic flow port 150, a supply port 100, and a plug receiving portion or end (e.g., illustrated recessed plug seat 160). In an embodiment, plastic internal ball guide 60 may be comprised of plastic and, further if desired, be formed or molded in the same operation as at least portions of the valve body 20 that are external to insert 30 and adjacent the plastic flow port 150. In an embodiment of the invention, a plastic flow port 150 may be located at or about the center longitudinal length of insert 30 or at about the center longitudinal position of the plastic internal ball guide 60. Further, if desired a plurality of plastic flow ports 150 may be included and configured to enhance internal material distribution associated with a molding operation relative to the formation of internal ball guide 60. Moreover, if desired, the geometry of insert 30 can be simplified for easier machining.

Figure 4A:
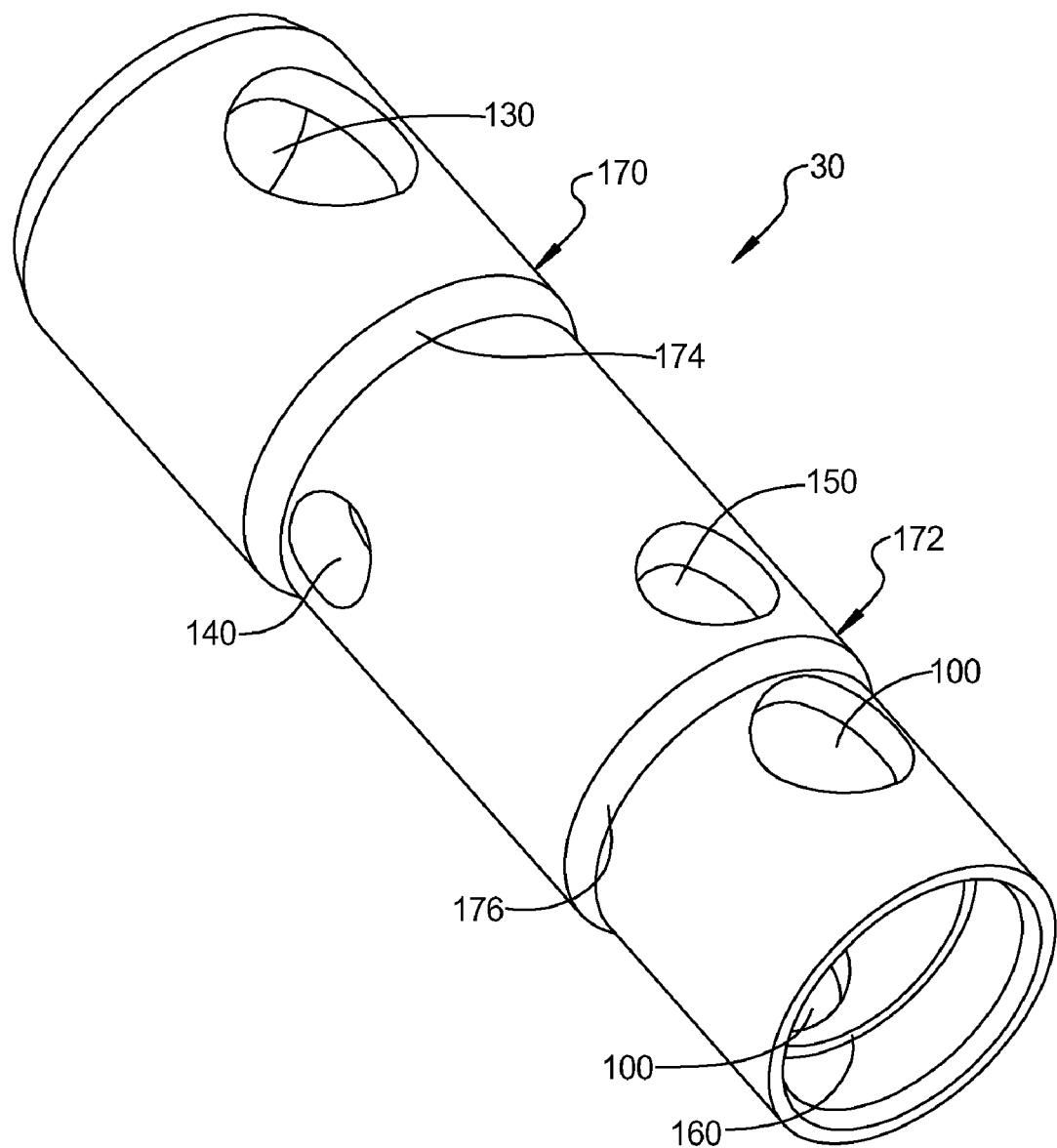
FIG. 4A is a side perspective view of an insert according to another embodiment of the invention.

Another embodiment of an insert is shown in FIG. 4A. The illustrated insert 30 is similar to that depicted in FIG. 4 but includes two diameter-reduction transition portions that are generally identified as 170 and 172. Without limitation, the transition portions may include a ramp or inclined portion or segment 174, 176 between adjacent portions of the insert 30 connected by respective portions or segments 174, 176.

However, it is again noted that the invention is not necessarily limited to an insert that includes a separate plastic flow port. That is, if desired for some configurations, one or more of the other "operational" ports associated with the assembly (e.g., pressure control port or supply port) may be utilized as a plastic "flow port" for purposes of forming all or a portion of an internal plastic component within the insert. For example, without limitation, a supply port (or ports) could be used as flow ports for forming all or a portion of a plastic internal ball guide within the insert and then subsequently serve its normal or intended role as a supply port for the assembly.

If desired, insert 30 may include a plurality of one or more of the aforementioned ports. That is, provided the desired operational functions and characteristics are sufficiently met, insert 30 may be configured to include a plurality of exhaust ports, control ports, plastic flow ports (which may be optional for some embodiments), and/or supply ports. For example, as generally illustrated in FIGS. 3 and 4, insert 30 may include two supply ports and two plastic flow ports, respectively. For instance, such "paired" combinations may be positioned approximately 180° relative to one another about the periphery of insert 30. Further, as generally shown in the illustrated embodiment, an exhaust port 130, a flow port 150 and a supply port 100 may be generally aligned along the length of insert 30, while a pressure control port 140 may be generally offset by 90° (about the periphery of insert 30) relative to foregoing ports. Moreover, the individual shapes, sizes and comparative sizes of the various ports can be configured and modified without departing from the spirit and scope of the present invention.

Various designs and configurations of an assembly according to the invention can be provided. For instance, some embodiments allow for the manufacture of a relatively inexpensive device and a method for porting of pressures in the valve assembly in which a supply pressure may be applied to the side of the valve assembly and a control pressure can be in communication with the end of the valve assembly. Such configurations may additionally provide a centering feature for a shut-off valve on the control end of the valve assembly, while employing a robust plug (e.g., a steel plug) as a barrier between the control and supply communication ports 140, 100.

The present invention further discloses novel methods for making a valve body for a pressure control valve assembly. Among other things, the present invention discloses a method for making a valve body in which several plastic portions, which may comprise the same or similar plastic materials, can be formed at the same time in connection with a single molding operation.

In an embodiment of the method, a metal insert with at least one port for permitting the flow of a plastic material and a plug-receiving end is provided. A mold core is also provided and a portion of the core is positioned within a portion of the insert.

In a general aspect of the embodiment, a portion of the core is inserted into the insert through the plug-receiving end of the insert. The insert (with core) may then be fully or partially enclosed within a mold cavity. Additional mold forming components, as necessary to form the desired assembly components (e.g., plastic channel-forming members that are intended to be positioned about the insert) may also be provided, and may be part of the core or set of core members. Plastic can then be molded about an outer surface of the insert such that a portion of the plastic being molded is permitted to flow about the insert and into the internal portion of the insert (where the plastic guide is intended) through a port associated with the insert. For some embodiments the port through which the plastic flows into the insert to form an internal plastic portion will be one or more separate plastic flow ports. With other embodiments of the invention, one or more of the assembly's operational ports (e.g., pressure control and/or supply ports) may be utilized as a plastic flow port for purposes of molding an internal component associated with the insert.

At least a portion of the plastic that flows through the aforementioned port or ports forms all, or at least a portion, of a plastic internal ball guide within a portion of the insert. The core (and/or other associated mold-formation components) can include portions that effectively seal off the other ports associated with the assembly such that the associated port or ports will be more readily available for operational use, as they will not be (or will be less) blocked by extraneous plastic material associated with the internal component formed within the insert.

After they have served their intended formation purpose the core, as well as any associated mold formation components that are employed to form the plastic internal ball guide and the valve body about the insert, may be removed. Embodiments of the foregoing method can permit the molding associated with the insert to take place (both internally and externally with respect to the insert) in connection with the same molding step or operation, and at or substantially at the same time. Of course, it is recognized that final formation times associated with the various components may vary. Moreover, if desired, the same plastic material can form portions of both the internal ball guide and the external valve body.

Further, in connection with embodiments of the method, the metal insert may include one or more exhaust ports, pressure control ports, and/or supply ports. Also, although the invention is not limited to a specific form of molding, the process may, for example, include injection molding and/or compression molding.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. It is intended that the scope of the invention be defined by the claims appended hereto and their equivalents.

What is claimed is:

1. A method for making a valve body for a pressure control valve assembly, comprising:
    providing a metal insert including a port for permitting the flow of a plastic material and a plug-receiving end, wherein said metal insert includes at least three separate ports for the exhaust, pressure control, and supply of fluids in the pressure control valve assembly;
    providing a mold core;
    positioning the mold core within a portion of the metal insert;
    enclosing the insert and positioned mold core within a mold cavity;
    molding plastic about an outer surface of the metal insert and molding plastic through the port permitting flow of a plastic material so as to form the valve body including at least a portion of a plastic internal ball guide within an inner portion of the metal insert; and
    removing the mold core from the resulting valve body.

2. The method of claim 1, wherein the port for permitting the flow of a plastic material is in addition to the exhaust port, the pressure port, and the supply port.

3. The method of claim 1, wherein the port for permitting the flow of a plastic material is at least one of the exhaust port, pressure control port, and supply port.

4. The method of claim 1, wherein the molding includes injection molding or compression molding.

5. The method of claim 1, wherein the molding of plastic about the outer surface of the insert and the molding of the internal ball guide within a portion of the insert occurs in connection with a single molding step or operation.

6. The method of claim 5, wherein the molding of plastic about the outer surface of the insert and the molding of the internal ball guide within a portion of the insert occurs and at or substantially at the same time.

7. The method of claim 1, wherein the mold core comprises a plurality of mold core components.

8. The method of claim 1, wherein one or more channel-forming members are formed about the metal insert as a result of said molding.

* * * * *